United States Patent
Ramanathan et al.

(10) Patent No.: US 11,062,314 B1
(45) Date of Patent: Jul. 13, 2021

(54) DYNAMIC TRAVEL PROFILE

(71) Applicant: Wells Fargo Bank, N.A., San Francisco, CA (US)

(72) Inventors: Ramanathan Ramanathan, Bellevue, WA (US); Andrew J. Garner, IV, State Road, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 743 days.

(21) Appl. No.: 14/690,820

(22) Filed: Apr. 20, 2015

(51) Int. Cl.
*G06Q 20/40* (2012.01)
*G06Q 20/32* (2012.01)
*H04W 4/021* (2018.01)
*G06Q 10/02* (2012.01)

(52) U.S. Cl.
CPC ......... *G06Q 20/4016* (2013.01); *G06Q 10/02* (2013.01); *G06Q 20/3224* (2013.01); *G06Q 20/405* (2013.01); *H04W 4/021* (2013.01)

(58) Field of Classification Search
CPC ............. G06Q 20/4016; G06Q 20/405; G06Q 20/3224; G06Q 10/02; H04W 4/021
See application file for complete search history.

(56) References Cited

U.S. PATENT DOCUMENTS

| | | | |
|---|---|---|---|
| 6,009,408 A | 12/1999 | Buchanan | |
| 8,229,853 B2 | 7/2012 | Dispensa et al. | |
| 8,412,593 B1 * | 4/2013 | Song | G06Q 30/00 705/27.1 |
| 8,666,841 B1 * | 3/2014 | Claridge | G06Q 20/4016 705/26.35 |
| 8,983,868 B1 * | 3/2015 | Sehrer | G06Q 20/3224 705/1.1 |
| 9,569,767 B1 * | 2/2017 | Lewis | G06Q 20/321 |
| 2007/0119919 A1 | 5/2007 | Hogg et al. | |
| 2011/0004497 A1 * | 1/2011 | Mortimore, Jr. | G06Q 30/0226 705/5 |

(Continued)

OTHER PUBLICATIONS

Akhtar N., Haq F.. (2011) Real Time Online Banking Fraud Detection Using Location Information. In: Das V.V., Thankachan N. (eds ) Computational Intelligence and Information Technology. CIIT 2011. Communications in Computer and Information Science, vol. 250. pp 770-772. Springer, Berlin, Heidelberg. (Year: 2011).*

*Primary Examiner* — Mike Anderson
*Assistant Examiner* — Bolko M Hamerski
(74) *Attorney, Agent, or Firm* — Foley & Lardner LLP (57) ABSTRACT

A computer-implemented method of facilitating payments from a financial account includes receiving a travel itinerary associated with an account holder. The travel itinerary includes an account holder identification (ID), a destination, and a time period associated with the destination. The method also includes associating the travel itinerary of the account holder with a financial account of the account holder based on the account holder ID. The financial account includes an associated payment device. In addition, the method includes building a dynamic travel profile for the account holder based at least in part on the travel itinerary. The dynamic travel profile is linked to the financial account. Further, the method includes receiving an authorization request for a transaction, and approving or declining authorization if the location and date of the transaction do not correspond to the destination and time period of the dynamic travel profile.

20 Claims, 3 Drawing Sheets

(56) References Cited

U.S. PATENT DOCUMENTS

| | | | |
|---|---|---|---|
| 2011/0208601 A1* | 8/2011 | Ferguson | G06Q 20/4016 705/16 |
| 2012/0158590 A1* | 6/2012 | Salonen | G06Q 10/02 705/44 |
| 2012/0245967 A1* | 9/2012 | Dispensa | G06Q 20/40 705/5 |
| 2013/0006858 A1 | 1/2013 | Depetro | |
| 2013/0013514 A1 | 1/2013 | MacKouse | |
| 2013/0046717 A1* | 2/2013 | Grigg | G06Q 30/02 706/46 |
| 2013/0080271 A1* | 3/2013 | Ronca | G06Q 20/20 705/16 |
| 2013/0179260 A1* | 7/2013 | Keohane | G06Q 30/02 705/14.53 |
| 2014/0046844 A1* | 2/2014 | Grigg | G06Q 20/20 705/44 |
| 2014/0337217 A1* | 11/2014 | Howe | G06Q 20/4016 705/44 |
| 2015/0046220 A1* | 2/2015 | Gerard | G06Q 30/0202 705/7.31 |
| 2015/0081349 A1* | 3/2015 | Johndrow | G06Q 20/3224 705/5 |
| 2015/0088735 A1* | 3/2015 | Howe | G06Q 20/341 705/41 |
| 2015/0227934 A1* | 8/2015 | Chauhan | G06Q 20/4016 705/44 |
| 2015/0310434 A1* | 10/2015 | Cheung | H04W 12/06 705/44 |
| 2015/0324816 A1* | 11/2015 | Unser | G06Q 30/02 705/7.31 |
| 2016/0098702 A1* | 4/2016 | Marshall | G06Q 20/20 705/44 |
| 2016/0300314 A1* | 10/2016 | Berntsson | G06Q 10/02 |
| 2016/0343096 A1* | 11/2016 | Kruglick | G06Q 10/02 |

* cited by examiner

| | Accounts/Debit Card/Credit Card | Default Policy | User Policy | Expiration Date | Registered Devices | Device policy |
|---|---|---|---|---|---|---|
| 314 | Account xxxx xxxx xxxx xxxx-2257 | Allow only to be used in US, online, branches, phone | Allow only in US branches and online | 12/31/2015 | (503) xxx-7896 | Phone should be within 5 feet of POS device at time of transaction |
| 316 | Credit Card xxxx-xxxx-xxxx-1181 | Allow only to be used in US, online, branches, phone | Allow all over the world, No online, No South America | 12/31/2016 | (503) xxx-7896 | |
| 318 | Debit Card xxxx-xxxx-xxxx-1235 | Allow only to be used in US, online, branches, ATM, phone, NO third-party ATM | Allow only in US-WA, US-CA | 12/31/2016 | (503) xxx-4567 | |
| 320 | Debit Card xxxx-xxxx-xxxx-1235 | Allow only to be used in US, online, branches, ATM, phone | Block the card when not wearing wearable device | 12/31/2016 | (503) xxx-4567 Wearable device: IPV6 address: xxxxx | Wearable device and phone should be within 5 feet of each other at time of transaction |
| 322 | Credit card xxxx-xxxx-xxxx-4567 | Allow only to be used in US, online, branches, phone, NO ATM | Allow only in Walmart and Amazon, both direct and online | 12/31/2020 | (503) xxx-4567 | |

DYNAMIC TRAVEL PROFILE

TECHNICAL FIELD

The present disclosure relates generally to the field of managing financial accounts. More particularly, the present disclosure relates to systems and methods to create and manage financial accounts based on dynamic travel profiles.

BACKGROUND

Financial institutions (FIs) and other organizations typically provide account holders with payment devices, such as credit cards, debit cards, or digital wallet systems. Account holders may use the devices to purchase goods or services or to withdraw funds, for example, via point-of-sale ("POS") devices, automatic teller machines ("ATMs"), through an Internet website, and in other ways.

FIs may attempt to prevent unauthorized or fraudulent transactions in various ways. For example, FIs may monitor payment device activity to identify out-of-pattern usage, which may indicate an attempted fraudulent use. For example, payment device activity patterns may include various details relating to transactions, such as transaction amounts, transaction locations, merchants, merchant categories, etc. If out-of-pattern usage is detected, the FI may decline authorization and may temporarily suspend usage of the payment device.

Account holders may notify their FIs on upcoming trips in order to prevent transactions from being declined due to perceived out-of-pattern usage. However, account holders may not always remember to notify their FI of travel plans. Further, the notification process may be error-prone due to manual data entry.

SUMMARY

One embodiment relates to a computer-implemented method of facilitating payments from a financial account. The method includes receiving, by a processor of a banking system, a travel itinerary associated with an account holder. The travel itinerary includes an account holder identification (ID), a destination, and a time period associated with the destination. The method also includes associating, by the processor, the travel itinerary of the account holder with a financial account of the account holder based on the account holder ID. The financial account includes an associated payment device. In addition, the method includes building, by the processor, a dynamic travel profile for the account holder based at least in part on the travel itinerary. The dynamic travel profile is linked to the financial account of the account holder. Further, the method includes receiving, by the processor, an authorization request for a transaction involving the financial account. The authorization request includes a transaction location and a transaction date. Further yet, the method includes approving or declining, by the processor, authorization of the transaction if the transaction location and the transaction date do not correspond to the destination and the time period of the dynamic travel profile.

Another embodiment relates to a payment system including a data storage system, and a processor and program logic stored in memory and executed by the processor. The program logic includes account management logic configured to retrieve account information associated with a financial account of an account holder. The program logic also includes dynamic travel profile logic configured to receive a travel itinerary associated with the account holder. The travel itinerary includes an account holder identification (ID), a destination, and a time period associated with the destination. The dynamic travel profile logic is also configured to associate the travel itinerary of the account holder to a financial account of the account holder based on the account holder ID. The financial account includes an associated payment device. In addition, the dynamic travel profile logic is configured to build a dynamic travel profile for the account holder based at least in part on the travel itinerary. The dynamic travel profile is linked to the financial account of the account holder. The program logic further includes transaction verification logic. The transaction verification logic is configured to receive an authorization request for a transaction involving the financial account. The authorization request includes a transaction location and a transaction date. The transaction verification logic is also configured to approve or decline authorization of the transaction if the transaction location and the transaction date do not correspond to the destination and the time period of the dynamic travel profile.

Another embodiment relates to a computer-implemented method performed by a financial institution computing system. The method includes receiving, by a processor of a banking system, a travel itinerary associated with an account holder. The travel itinerary includes an account holder identification (ID), a destination, and a time period associated with the destination. The method also includes associating, by the processor, the travel itinerary of the account holder with a financial account of the account holder based on the account holder ID. The financial account includes an associated payment device. The method further includes building, by the processor, a dynamic travel profile for the account holder based at least in part on the travel itinerary. The dynamic travel profile is linked to the financial account of the account holder. In addition, the method includes predicting, by the processor, a potential purchase based on the dynamic travel profile of the account holder. Further yet, the method includes providing to the account holder, by the processor, a payment recommendation for the potential purchase. The payment recommendation is made based on the dynamic travel profile of the account holder.

Another embodiment relates to a financial institution computing system. The system includes a data storage system, and a processor and program logic stored in memory and executed by the processor. The program logic includes account management logic configured to retrieve account information associated with a financial account of an account holder. The program logic also includes dynamic travel profile logic configured to receive a travel itinerary associated with the account holder. The travel itinerary includes an account holder identification (ID), a destination, and a time period associated with the destination. The dynamic travel profile logic is also configured to associate the travel itinerary of the account holder to a financial account of the account holder based on the account holder ID. The financial account includes an associated payment device. The dynamic travel profile logic is further configured to build a dynamic travel profile for the account holder based at least in part on the travel itinerary. The dynamic travel profile is linked to the financial account of the account holder. The program logic further includes payment optimization logic. The payment optimization logic is configured to predict a potential purchase based on the dynamic travel profile of the account holder. The payment optimization logic is also configured to provide to the account holder a payment recommendation for the potential purchase. The payment recommendation is made based on the dynamic travel profile of the account holder.

Another embodiment relates to a computer-implemented method performed by a financial institution computing system. The method includes creating a bi-directional link with a travel reservation system. The method also includes receiving, from the travel reservation system, a prospective travel itinerary associated with an account holder of the financial institution. In addition, the method includes displaying an offer, via the travel reservation system, to associate a payment device with the prospective travel itinerary. The method further includes receiving, via the travel reservation system, a selection of the payment mechanism. Further yet, the method includes creating a dynamic travel profile based on the prospective travel itinerary. The dynamic travel profile is linked to the selected payment device.

Another embodiment relates to a computer-implemented method performed by a financial institution computing system. The method includes receiving, by a processor of a banking system, a travel itinerary associated with an account holder. The travel itinerary includes an account holder identification (ID), a destination, and a time period associated with the destination. The method also includes associating, by the processor, the travel itinerary of the account holder with a financial account of the account holder based on the account holder ID. The financial account includes an associated payment device. The method further includes building, by the processor, a dynamic travel profile for the account holder based at least in part on the travel itinerary. The dynamic travel profile is linked to the financial account of the account holder. Still further, the method includes monitoring a geolocation of the payment device. Finally, the method includes providing a notification to the account holder upon detecting that the geolocation of the payment device does not correspond to the destination and the time period of the dynamic travel profile.

Another embodiment relates to a computer-implemented method performed by a financial institution computing system. The method includes receiving, by a processor of a banking system, a travel itinerary associated with an account holder. The travel itinerary includes an account holder identification (ID), a destination, and a time period associated with the destination. The method also includes associating, by the processor, the travel itinerary of the account holder with a financial account of the account holder based on the account holder ID. The financial account includes an associated payment device. The method further includes building, by the processor, a dynamic travel profile for the account holder based at least in part on the travel itinerary. The dynamic travel profile is linked to the financial account of the account holder. Still further, the method includes monitoring a geolocation of the payment device, and monitoring context. The context includes a purchase history of the account holder. In addition, the method includes detecting that the geolocation of the payment device does not correspond to the destination and the time period of the dynamic travel profile. Finally, the method includes automatically updating the dynamic travel profile based on the context.

DETAILED DESCRIPTION

The present disclosure relates to an FI computing system. The FI computing system includes dynamic travel profile logic configured to build a dynamic travel profile for an account holder based on a travel itinerary associated with the account holder. The dynamic travel profile is associated with a financial account of the account holder. The dynamic travel profile logic may detect changes to the travel itinerary and may automatically update the dynamic travel profile based on the detected changes.

The FI computing system also includes transaction verification logic configured to approve or decline authorization of transactions based on the dynamic travel profile and transaction verification rules. The transaction verification rules may be defined with respect to location, context, proximity between registered devices, and other factors. The transaction verification logic may be configured to transmit periodic (e.g., daily) summaries of transactions made with registered payment devices, and may also notify the account holder of any unexpected charges, based on the dynamic travel profile and transaction usage patterns, device location, etc. The FI computing system may also include payment optimization logic configured to recommend usage of particular payment devices or particular financial accounts in certain situations. Recommendations may be made based on various factors, such as location, context, interest rates, fees, merchants, the account holder's financial health, and/or other factors.

Figure 1:
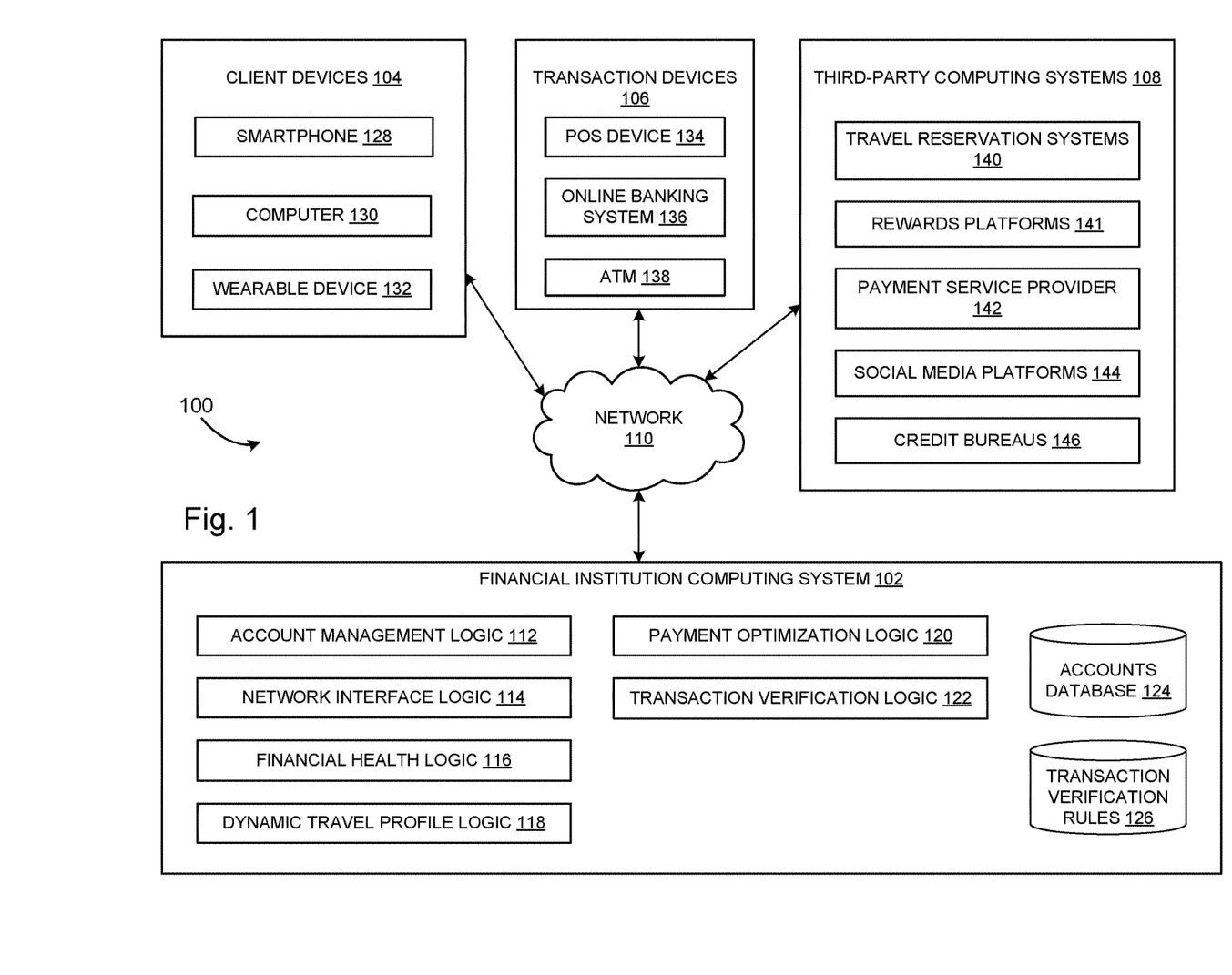
FIG. 1 is a block diagram of a payment system, according to an embodiment.

FIG. 1 is a block diagram of a payment system 100, according to an embodiment. The payment system 100 may implement dynamic card usage controls to prevent unauthorized financial transactions. As illustrated in FIG. 1, the payment system 100 includes an FI computing system 102. The payment system 100 may also include, among other devices and systems, client devices 104, transaction devices 106, and third-party computing systems 108, which may be in communication with the FI computing system 102 over a network 110.

The FI computing system 102 may be configured to, among other things, manage account holders' personal financial accounts at an FI, such as a bank. In the example illustrated in FIG. 1, the FI computing system 102 is implemented by an enterprise computing system of an FI at which an account holder has one or more financial accounts.

The FI computing system 102 may include, among other logics and systems, account management logic 112, network interface logic 114, financial health logic 116, dynamic travel profile logic 118, payment optimization logic 120, and transaction verification logic 122. Such systems and logics and other systems and logics discussed herein may, in practice, be implemented in a machine (e.g., one or more computers or servers) comprising machine-readable storage media (e.g., cache, memory, internal or external hard drive or in a cloud computing environment) having instructions stored therein which are executed by the machine to perform the operations described herein. For example, the FI computing system 102 may include server-based computing systems comprising one or more networked computer servers that are programmed to perform the operations described herein. In another example, the FI computing system 102 may be implemented as a distributed computer system where each function is spread over multiple computer systems. The FI computing system 102 may also include an accounts database 124 configured to store various financial account information and records of account holders. In addition, the FI computing system 102 may include transaction verification rules 126 based on which transaction authorization requests may be approved or declined.

The client devices 104 may include, for example, a smartphone 128, a computer 130 (e.g., a desktop, laptop, tablet, etc.), a wearable device 132 (e.g., a smartwatch, smartglasses, an activity tracker, a virtual reality device, an augmented reality device, etc.), or other types of devices. The client devices 104 may be used to access the FI computing system 102 over the network 110. For example in some embodiments, the FI computing system 102 may be accessed over the network 110 through a website or an application stored in memory on the client device 104. In some embodiments, the client devices 104 are configured for two-way communication with the FI computing system 102. However, in other embodiments, the client devices 104 are configured for one-way communication with the FI computing system 102, such as to receive a notification from the FI computing system 102. As explained in further detail below, one or more of the client devices 104 may be registered and associated with a financial account. In some embodiments, the client devices 104 may be configured to transmit a geolocation signal to the FI computing system 102 to notify the FI computing system 102 of the location of the device, which, in certain situations, may be used to infer the location of the account holder. In further embodiments, the client devices 104 may be configured to sense their proximity to other client devices 104 or to other objects (e.g., beacons). As explained in further detail below, the transaction verification rules 126 may include location-based and proximity-based rules. In some embodiments, the client devices 104 may be used to transfer payment for a transaction, for example, through a mobile wallet application stored in memory on the client device 104.

The transaction devices 106 may include, for example, a POS device 134, an online banking system 136, an automated teller machine (ATM), and other systems. For example, POS devices 134 may be used to execute transactions with merchants. The POS device 134 may include any combination of hardware and/or software, including but not limited to electronic and manual cash registers, scanners, touch screens, electronic funds transfer terminals, weighing scales, and any other wide variety of hardware and software available for use with POS devices. In general, to perform a transaction, a merchant scans a payment device of an account holder, and a payment authorization request is transmitted from the POS device 134 to the FI computing system 102. The FI computing system 102 verifies the payment device number, the transaction type, and the amount with the cardholder's account, and reserves that amount of the cardholder's account balance or credit limit for the merchant. The payment authorization request may also include a location of the transaction device 106. The FI computing system 102 may then either approve or decline the transaction authorization request based on the verification and further based on fraud prevention analysis. Upon receiving approval of the authorization request, the merchant may complete the transaction.

The third-party computing systems 108 may include, for example, travel reservation systems 140, rewards platforms 141, payment service providers (PSPs) 142, social media platforms 144, credit bureaus 146, and other systems. As explained in further detail below, account holders may arrange trips through the travel reservation systems 140. Arranging trips may include, for example, reserving and/or purchasing any of various trip components, such as flights, lodging, rental cars, train tickets, cruises and other boat trips, event (e.g., concert, theater, etc.) tickets, restaurant reservations, etc. In some embodiments, the travel reservation systems 140 may interface with the FI computing system 102 and/or other systems to offer and/or recommend various forms of payment, such as payment using particular payment devices (e.g., credit or debit cards), particular payment accounts, rewards points or miles, gift cards, etc., or any combination thereof. The travel reservation systems 140 may include individual merchants or travel brokers, such as Orbitz™, Expedia™, Travelocity™, etc. In some embodiments, a payment device or mechanism may include a payment optimizer system. For example, the payment optimizer system may automatically select particular financial accounts from which to make a payment based on any of various factors.

Rewards platforms 141 may include any of various types of rewards or customer loyalty programs, which may correspond to various industries, such as airlines, FIs (e.g., banks or credit card issuers, hotels, rental cars, retailers, etc. Certain rewards platforms 141 may offer frequent-flyer miles, which can be redeemed for air travel or other goods or services. Other rewards platforms 141 may offer cash back, which may vary depending on transactions within particular product categories or with particular retailers. Some rewards platforms 141 may offer discounts on products.

Various levels of integration are available between the FI computing system 102 (e.g., via the dynamic travel profile logic 118) and a third-party computing system 108, such as the travel reservation system 140, over the network 110. For example, in one embodiment, the travel reservation system 140 may display links to common FIs upon booking a travel reservation. Upon selecting one of the links, the user may be prompted for his or her login information for the selected FI. Upon entering the login information, the account holder's travel itinerary may be transmitted from the travel reservation system 140 to the selected FI.

In another embodiment, the travel reservation system 140 may automatically recognize the FI of an account holder (e.g., based on the account holder's payment card number), and may transmit the account holder's travel itinerary to the account holder's FI. For example, the travel reservation system 140 may recognize the account holder's FI by the issuer identification number (IIN)/bank identification number (BIN), which is included in the first six digits of a payment card number. Upon recognizing the account holder's FI, the travel reservation system 140 may prompt the account holder for permission to transmit the travel itinerary to the account holder's FI. For example, the travel reservation system 140 may prompt the user with the question "Would you like us to send your itinerary to your bank (Wells Fargo™)?" Upon receiving an answer in the affirmative, the travel reservation system 140 may transmit the account holder's travel itinerary to the account holder's FI.

In another embodiment, the travel reservation system 140 may utilize one or more PSPs 142 (e.g., Google Wallet™, Paypal™, Visa Checkout™, Mastercard MasterPass™, etc.) to make a payment (e.g., to book a travel reservation). The PSP 142 that is utilized by the account holder may be configured to transmit the travel reservation to the account holder's FI associated with the PSP 142. For example, an account holder may have one or more financial accounts (e.g., credit cards and/or bank accounts) associated with a PSP 142 account. In addition to facilitating payment between the travel reservation system 140 and the account holder's financial account, the PSP 142 may also receive the account holder's travel reservation from the travel reservation system 140, and may transmit the travel reservation to the FI corresponding to the financial account used to make the purchase.

In another embodiment, the FI computing system 102 or a third-party computing system 108 may provide an application programming interface (API) to the travel reservation system 140 to enable functionality of the FI computing system 102 to be integrated into the travel reservation system 140. The travel reservation system 140 may include functionality to establish a bi-directional communication link with the FI computing system 102 to enable information to be transmitted therebetween. For example, in an embodiment, an account holder may log in to their financial account (e.g., via the account management logic 112 of the FI computing system 102) directly through the travel reservation system 140. In such embodiments, the dynamic travel profile logic 118 may receive, from the travel reservation system 140, the travel itinerary associated with the account holder. Because the account holder has already logged into their financial account through the travel reservation system 140, the travel itinerary may automatically be associated with a financial account of the account holder. In some embodiments, account holders may also select various card usage controls (e.g., which may be managed by the transaction verification logic 122 of the FI computing system 102) directly from the travel reservation system 140 while the account holder is creating reservations for a trip.

Turning now to the logics and systems of the FI computing system 102, the account management logic 112 is configured to interact with various backend systems in connection with maintaining financial accounts for account owners. For example, the account management logic 112 may manage bank accounts (e.g., checking and savings accounts) of account holders. The account management logic 112 manages each account holder's accounts by facilitating, among other things, account processing, account records management, statement generation, bill pay, funds transfers, etc. Account records include, among other things, records of financial transactions associated with each account. Financial transactions may include, for example, credits or debits to an account holder's account, such as the purchase of a good or the deposit of a paycheck, and various metadata associated therewith. Account information and records may be stored in the accounts database 124.

The network interface logic 114 may be used to connect the FI computing system 102 to the network 110 to permit account holders to access the FI computing system 102, for example, through websites or applications (e.g., online banking websites or applications), which may be accessed via the client devices 104, or in other ways. For example, the network interface logic 114 may include one or more computers or web servers that provide a graphical user interface (e.g., a series of dynamically-generated web pages) for account holders to access the FI computing system 102 through a website or an application. The graphical user interface may be used to prompt the account holder to provide login information, passwords, or other authentication information or other stored tokens. Upon successfully logging in, the graphical user interface may be used to provide the account holder with account information (e.g., account balances, transaction history, fraud warnings, etc.). The network interface logic 114 may also comprise other logic that is configured to provide an interface for other types of systems and devices such as the transaction devices 106, the third-party computing systems 108, mobile devices (e.g., cellular phones, smartphones, smartwatches, wearable devices, tablet computers, mobile e-mail devices, etc.), fax machines, ATMs, server-based computing systems, etc. The network interface logic 114 may provide access to an application programming interface (API) for the third-party computing systems 108.

The financial health logic 116 is configured to manage the state of account holders' personal financial situations. The financial health logic 116 may include various aspects, such as managing budgets and financial goals, monitoring credit history, etc. In some embodiments, the financial health logic 116 is configured to provide recommendations to account holders on steps that the account holders may take to improve and/or maintain their overall financial health. For example, the FI computing system 102 may offer certain products or services to an account holder based on his or her individual financial health.

The dynamic travel profile logic 118 is configured to build and manage a dynamic travel profile based on a travel itinerary, which may be received in various ways. For example, the travel itinerary may be received in a conventional manner in which an account holder contacts his or her FI to inform the FI of his or her travel plans. The travel itinerary may also be received from one of the third-party computing systems 108, such as the travel reservation system 140. Additionally or alternatively, the dynamic travel profile logic 118 may be configured to build and manage the dynamic travel profile based on travel components, which may be identified in various ways, such as by analyzing the account holder's transactions, calendar items, social media updates, or in other ways.

The dynamic travel profile logic 118 is dynamic in the sense that it may automatically update the dynamic travel profile based on detected changes to the travel itinerary. Changes to the travel itinerary may be detected using the same techniques used to build the dynamic travel profile or in other ways. For example, the dynamic travel profile logic 118 may identify that the account holder revised flight reservations to depart on a later date or reserved a hotel room for an extra night. As another example, the dynamic travel profile logic 118 may receive a geolocation signal from one or more of the account holder's client devices 104 that indicates that the account holder is at a location different than that specified in the account holder's travel itinerary. In some implementations, the dynamic travel profile logic 118 may query the account holder (e.g., via one of the client devices 104), to verify an inferred update to the account holder's dynamic travel profile. In other embodiments, the dynamic travel profile logic 118 monitors context, which may include a purchase history of the account holder, for example. Upon detecting that the geolocation of the client device 104 does not correspond to the destination and the time period of the dynamic travel profile, the dynamic travel profile logic 118 may automatically update the dynamic travel profile based on the context. For example, the purchase history of the account holder may include a flight ticket. Upon detecting that the client device 104 is in an unexpected location, the dynamic travel profile logic 118 may infer that the account holder has changed his or her travel plans, and may update the dynamic travel profile accordingly. In one implementation, the dynamic travel profile logic 118 automatically updates the dynamic travel profile only based on purchases within a validated purchase category (e.g., flight tickets, train tickets, lodging reservations, etc.).

In some embodiments, the dynamic travel profile logic 118 is further configured to provide account holders with particular payment devices based on the account holders' dynamic travel profile. For example, the dynamic travel profile logic 118 may detect that an account holder's dynamic travel profile indicates that the account holder will be traveling to a country that requires a payment device that the account holder does not have. For example, an account holder may be planning a trip to the United Kingdom, which requires chip and PIN payment systems, which may not be required in the account holder's home country. The dynamic travel profile logic 118 may automatically ship to the account holder a replacement payment device (e.g., credit or debit card) having a computer chip. In other embodiments, the dynamic travel profile logic 118 is configured to provide offers to the account holder regarding an alternative or temporary payment device. In another embodiment, the dynamic travel profile logic 118 is configured to enable alternative features on one of the account holder's existing payment devices. In implementations involving chip and PIN devices, the dynamic travel profile logic 118 may also automatically issue a PIN or may notify the account holder to set a PIN.

The payment optimization logic 120 is configured to optimize payments for transactions based on various factors. In some embodiments, the payment optimization logic 120 is configured to operate in connection with the travel reservation systems 140 to recommend optimal payment devices for reserving and/or purchasing travel components. The payment optimization logic 120 may also operate in connection with the dynamic travel profile logic 118 to recommend optimal payment devices for transactions that are attempted or predicted to be attempted by the account holder during a trip. For example, payment optimization recommendations may include recommending that a particular payment device (e.g., a credit or debit card) be used to conduct a transaction. The payment optimization recommendations may be provided based on, for example, location, context, interest rates, fees, merchants, the account holder's financial health, rewards points, and/or other factors. Payment recommendations may be made with respect to reserving, purchasing, and/or updating travel reservations, as well as with respect to transactions performed during a trip.

In some embodiments, account holders may link various financial accounts (e.g., checking or savings accounts, credit cards, rewards/loyalty programs, etc.) with the FI computing system 102 via the payment optimization logic 120, whether the financial accounts are associated with the FI that manages the FI computing system 102 or associated with other institutions. In some embodiments, the payment optimization logic 120 is configured to automatically determine all of an account holder's financial accounts (e.g., checking and savings accounts, credit card accounts, etc.) by pulling the account holder's credit history (e.g., performing a soft pull) from one or more credit bureaus 146. The payment optimization logic 120 may cross-reference the account holder's accounts with various databases to determine financial parameters associated with each account, such as interest rates, reward points, fees, etc. Accordingly, the payment optimization logic 120 may recommend paying for a transaction via any of the account holder's accounts. In some embodiments, the payment optimization logic 120 may also provide offers for new accounts or other financial services, including accounts at other FIs, based on financial parameters associated with those accounts.

In some embodiments, the payment optimization logic 120 is configured to allow account holders to define various preferences relating to the financial accounts. For example, some account holders may value certain types of rewards points (e.g., cash back, airline miles, points, etc.) higher than others. For example, an account holder may prefer airline miles with a particular airline over cash back rewards. In addition, the payment optimization logic 120 may allow account holders to define the value of certain rewards. For example, an account holder may specify that the account holder values 3,000 airline miles as $100. Because different financial accounts may provide different rewards (e.g., 1.5% cash back, 10,000 bonus miles after spending $25,000, etc.), the payment optimization logic 120 may analyze potential rewards associated with various accounts in order to recommend paying for a transaction using a particular account. In addition, the payment optimization logic 120 may provide offers for new accounts based on analyzing potential rewards associated with the new accounts.

In some embodiments, the payment optimization logic 120 is configured to predict purchases that an account holder is likely to make on a trip based on the dynamic travel profile associated with the account holder. Purchases may be predicted based on various factors, such as based on the account holder's prior transaction history, based on the particular travel components, based on transaction history of other account holders, etc. As an illustrative example, the payment optimization logic 120 may recognize that an account holder typically travels to Hawaii every year in February. Thus, the payment optimization logic 120 may analyze the transactions that the account holder has performed during prior trips to Hawaii to predict transactions that are likely to be made during an upcoming trip. The payment optimization logic 120 may provide recommendations to the account holder to utilize certain payment devices, for example, according to the predicted transactions.

The transaction verification logic 122 is configured to approve or decline transactions based on transaction verification rules 126. The transaction verification logic 122 may also identify potentially fraudulent transactions based on the transaction verification rules 126. In one embodiment, the transaction verification logic is implemented by an enterprise transaction verification system, which may include a central and distributed architecture of contextual proxy systems that is configured to verify transactions according to the transaction verification rules 126 before the transactions are allowed with a recipient system (e.g., one of the transaction devices 106). The transaction verification rules 126 may include default rules defined by the FI that manages the FI computing system 102. In some embodiments, the transaction verification rules 126 may also be edited and further defined by an account holder (e.g., via a website or application of the FI computing system 102). Account holders may define the transaction verification rules 126 to be in effect indefinitely, or to be in effect based on other factors. As discussed in further detail below, the transaction verification rules 126 may be any combination of location-based, temporally-based, context-based, device-based, etc.

In an embodiment, the transaction verification rules 126 are applied automatically based on the dynamic travel profile of an account holder. When a transaction is attempted, the transaction verification logic 122 collects various types of information related to the transaction in order to authenticate the transaction according to the transaction verification rules 126. For example, the transaction verification logic 122 may collect a payment device identifier (e.g., credit or debit card number, mobile wallet token, etc.), POS device 134 information (e.g., address, owner, location, etc.), and other information from the POS device 134. The transaction verification logic 122 may also collect policy-related transaction information from devices that are registered with the transaction verification logic 122. In one embodiment, the transaction verification logic 122 collects the policy-related transaction information by establishing a connection with an application that is pre-installed on the registered devices. The policy related information may include, for example, a geolocation of the device, a proximity of the device to another object (e.g., a POS device 134 or another device), biometric information (e.g., a fingerprint, a voice recording, an image, a heart rate, etc.), and other types of information.

In one embodiment, the account holder's smartphone 128 may be registered with the transaction verification logic 122. The smartphone 128 may include an application stored in memory that is managed by the FI computing system 102. The smartphone 128, via the application, may be configured to transmit geolocation signals to the FI computing system 102 when a transaction is attempted. The transaction verification rules 126 may be defined with respect to the geolocation of the smartphone 128. For example, one of the transaction verification rules may require the geolocation of the smartphone 128 to match the account holder's expected location according to the account holder's dynamic travel profile. Another transaction verification rule 126 may require the smartphone 128 to be within a certain proximity of the transaction device 106. As the location of the account holder changes while traveling, the transaction verification logic 122 may provide enhanced fraud protection and fewer false-positive transaction denials, based on an understanding of the account holder's expected location and context, according to the dynamic travel profile. In addition, false-positive transaction denials are also reduced because the dynamic travel profile is configured to detect changes to the itinerary and to dynamically update the dynamic travel profile according to the detected changes.

In some embodiments, account holders may register multiple devices 104 with the transaction verification logic 122. For example, the account holder may register both a smartphone 128 and a wearable device 132 (e.g., a fitness tracker, a smartwatch, smartglasses, etc.). In addition to the geolocation and proximity-based rules described above, additional transaction verification rules 126 may require the smartphone 128 to be within a certain proximity of the wearable device 132. Another rule may require each of the smartphone 128 and the wearable device 132 to be within a certain proximity of the transaction device 106. Another rule may require additional identifying information (e.g., biometric information) to be transmitted from at least one of the smartphone 128 and the wearable device 132, which may be validated by the transaction verification logic 122. In some embodiments, the transaction verification rules 126 may require the client device 104 to be within a certain proximity of a trusted device that is associated with another individual (e.g., the account holder's spouse's device).

In some embodiments, a client device 104 (e.g., a smartphone 128) may be configured to transmit geolocation signals to the FI computing system 102 continually on a periodic basis. The transaction verification logic 122 may be configured to analyze the geolocation signals in near real-time to monitor the location of the client device 104, which may be used as a proxy to monitor the location of the account holder. The transaction verification logic 122 may compare the location of the client device 104 to an expected location based on the account holder's dynamic travel profile. If the location of the client device 104 does not match its expected location, the client device 104 may have been stolen or misplaced. In such a situation, the transaction verification logic 122 may send a notification to the account holder and may block transactions with the account holder's account. In some embodiments, the transaction verification logic 122 may request additional account verification information from the account holder before blocking transactions with the account. In some embodiments, the transaction verification logic may be configured to detect heightened fraud risks based on various factors, such as based on particular physical locations, particular retailers, based on news topics trending on social media platforms 144, etc. Upon detecting heightened fraud risks, the transaction verification logic 122 may apply enhanced transaction verification rules, such as, for example, requiring a PIN, recommending or disabling a particular payment device, etc.

Figure 2:
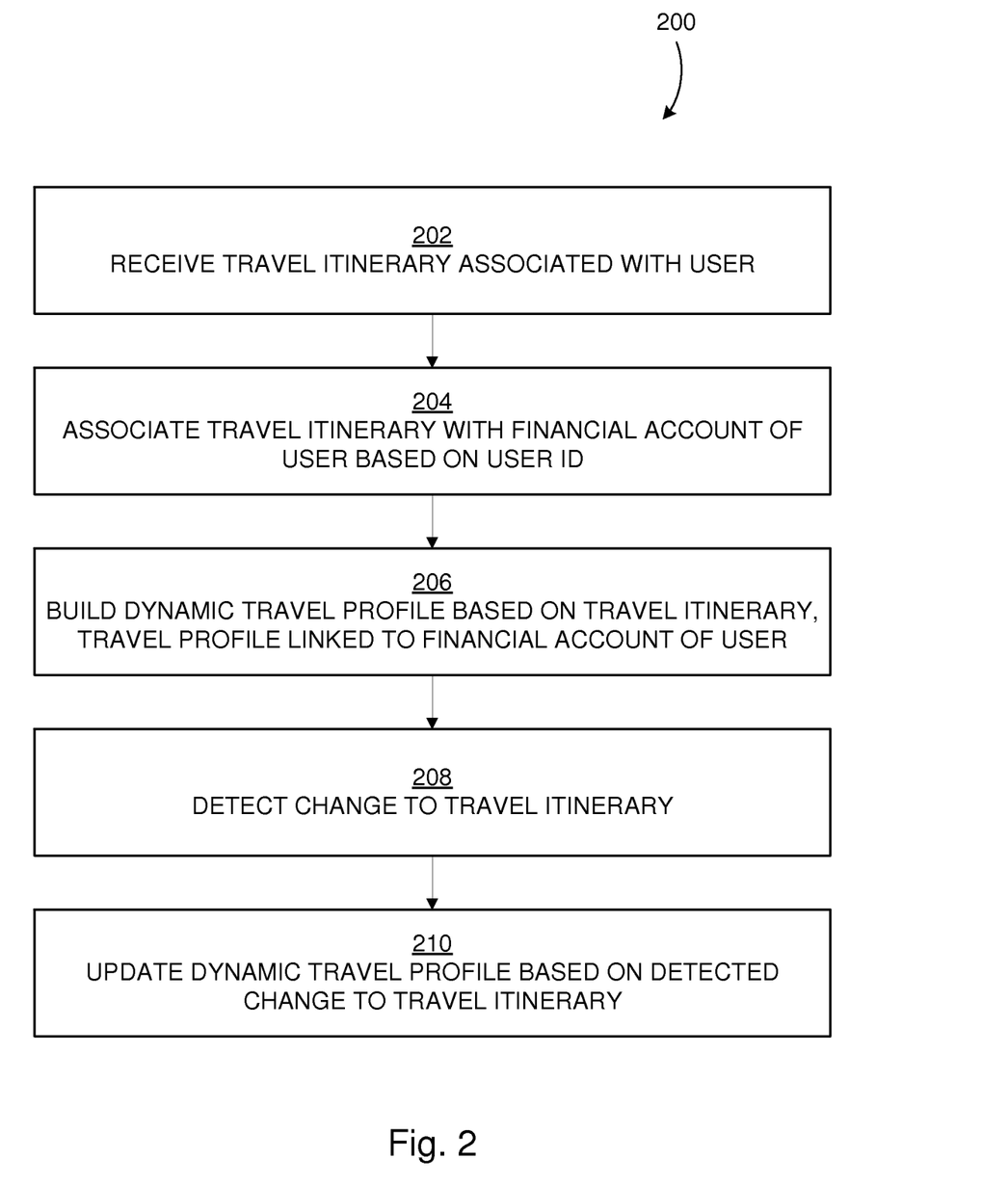
FIG. 2 is a flow diagram of a method of building a dynamic travel profile, according to an embodiment.

Turning to FIG. 2, a flow diagram of a method 200 of building a dynamic travel profile is illustrated, according to an embodiment. The method 200 may be performed by the FI computing system 102 of FIG. 1, leveraging the dynamic travel profile logic 118.

At 202, a travel itinerary associated with an account holder is received. For example, the travel itinerary may include an account holder identification (ID) code. The travel itinerary may include at least one destination and a date or time period associated with the destination. The destination may be defined by at least one of a country, state city, street address, geolocation, and GPS coordinates. In some embodiments, the destination is further defined by an area. For example, the area may be defined by a circle having a pre-determined radius and centered at the at least one of a country, state, city, street address, geolocation, and GPS coordinates. In one example, the travel itinerary may include "Paris, France; Jun. 1-8, 2015." The travel itinerary may be a prospective (e.g., not finalized and/or purchased) itinerary, a finalized itinerary (e.g., in which travel reservations are booked and/or paid for), or may be partially finalized. The travel itinerary may be received in various ways and from various sources. In an embodiment, the dynamic travel profile logic 118 may receive the travel itinerary from the travel reservation system 140.

In some embodiments, the travel itinerary includes a collection of travel components. Travel components may include, for example, transportation (e.g., airline, rail, rental car, cruise, etc.) reservations or tickets, lodging (e.g., hotel, hostel, home or apartment rental, etc.) reservations, event (e.g., concert, theater, festival, etc.) tickets, dining reservations, etc. Each travel component may have a corresponding date and location (e.g., destination). In some embodiments, the dynamic travel profile logic 118 receives and/or amends the travel itinerary by way of the travel components, which may be received from various sources, such as through transaction history (e.g., via the account management logic 112 and the accounts database 124), or via other linked accounts (e.g., calendars, third-party financial accounts, etc.).

At 204, the travel itinerary is associated with a financial account of the account holder, based on the account holder ID associated with the travel itinerary. The account holder ID may be linked to a customer number or an account number associated with the account holder. In some embodiments, the account holder ID is a universal login (e.g., Google™, Facebook™, Amazon™, Twitter™, Microsoft™, etc.) that may be used to login to various third-party websites and applications.

At 206, a dynamic travel profile is built by the dynamic travel profile logic 118 based on the travel itinerary. The dynamic travel profile is linked to the financial account of the account holder that was associated with the account holder at 204.

At 208, a change to the travel itinerary is detected by the dynamic travel profile logic 118. Changes to the travel itinerary may be detected in various ways. For example, the dynamic travel profile logic 118 may receive an updated travel itinerary from the travel reservation system 140. Changes may also be detected through the account holder's transaction history (e.g., via the account management logic 112 and the accounts database 124), or through other linked accounts (e.g., calendars, third-party financial accounts, etc.), or in other ways.

At 210, the dynamic travel profile is updated based on the change to the travel itinerary detected at 208. Accordingly, the dynamic travel profile is configured to automatically update based on detected changes. As described in further detail below, the dynamic travel profile is utilized by the transaction verification logic 122 to provide enhanced transaction authorization capabilities for account holders while the account holders are traveling.

Figure 3:
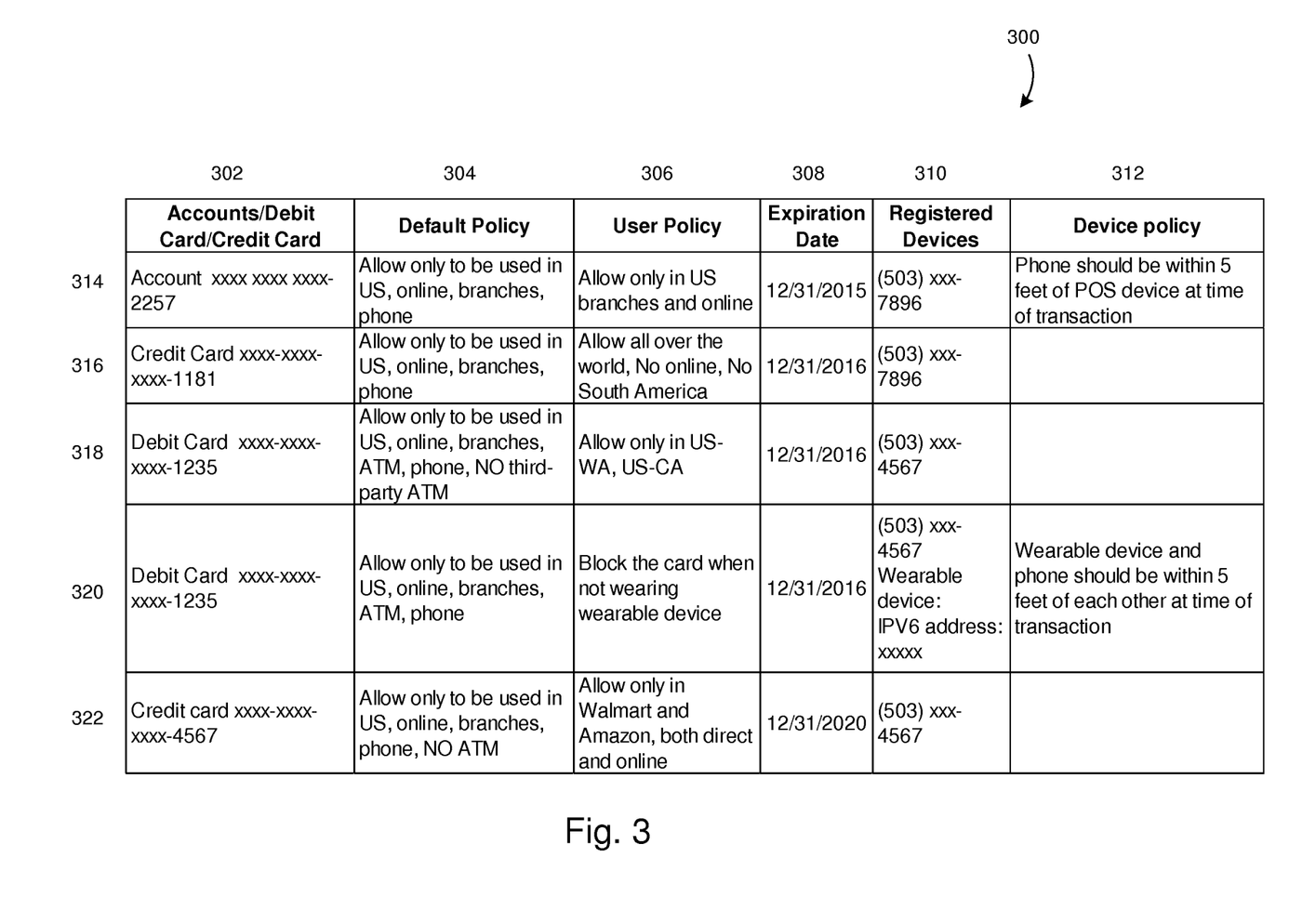
FIG. 3 is a table including example transaction verification rules, according to an embodiment.

Turning to FIG. 3, a table 300 including example transaction verification rules 126 of FIG. 1 is shown, according to an embodiment. For example, the transaction verification rules 126 may be implemented by the transaction verification logic 122 of the FI computing system 102 of FIG. 1. The transaction verification rules 126 include various fields, including payment mechanisms 302, default policies 304, account holder policies 306, expiration dates 308, registered devices 310, and device policies 312. Each field may be defined according to one or more rules. The transaction verification rules 126 may be implemented in conjunction with or independently of the dynamic travel profile logic 118. As illustrated in FIG. 3, the transaction verification rules 126 include first, second, third, fourth, and fifth rules 314, 316, 318, 320, 322. The transaction verification rules 126 may be accessed by an account holder, for example, through websites or applications (e.g., online banking websites or applications) of the FI computing system 102.

The payment mechanisms 302 may include any account or payment device that an account holder may use to conduct a financial transaction. For example, the payment mechanism 302 of the first rule 314 is a financial account. Therefore, the first rule 314 applies with respect to any transaction attempted with the financial account. The second and fifth rules 316, 322 apply with respect to credit cards. The third and fourth rules 318, 320 apply with respect to a debit card. The third and fourth rules 318, 320 illustrate that multiple rules can apply to a single payment mechanism 302 (e.g., a particular debit card).

The default policies 304 are policies that may be defined automatically by an FI. FIs may define default policies 304 based on various factors, such as the payment mechanism 302 (e.g., financial account, credit card, debit card, etc.), the financial health of the account holder, etc. As illustrated in FIG. 3, the default policies 304 may apply with respect to location (e.g., U.S. only) and transaction device (e.g., online, branches, ATM, phone, etc.).

The account holder policies 306 are policies that may be defined and edited by account holders. For example, an account holder may define or edit an account holder policy 306 before leaving for a trip so that the account holder's card will not be blocked at the location to which the account holder will be traveling. The account holder policies 306 may be defined with respect to location, transaction device, context, and other factors. In addition, the account holder policies 306 may be defined with respect to devices (e.g., wearable devices) and merchants (e.g., Walmart, Amazon, etc.). For example, one account holder policy 306 may define that all ATM transactions at non-Wells Fargo™ ATMs are to be blocked. Another example account holder policy 306 may define that transactions attempted when the user's heartbeat (e.g., as detected by the user's smartwatch) is greater than 110 beats-per-minute are to be blocked.

The expiration dates 308 define the date on which the rule will expire. Additionally or alternatively, some embodiments may include an activation date. The registered devices 310 may include various devices (e.g., the client devices 104 of FIG. 1) that are associated with an account holder's financial account. For example, the registered devices 310 may include a smartphone (e.g., the smartphone 128 of FIG. 1) of an account holder. For example, each of the client devices 104 may be registered with reference to any of several identifying characteristics, such as phone number, international mobile equipment identity (IMEI) number, mobile equipment identifier (MEID), electronic serial number (ESN), Ethernet address, globally unique identifier (GUID), Internet protocol version 6 (IPV6) address, etc.

The device policies 312 define states of registered devices that are required in order for a transaction to be authorized. For example, the device policies 312 may require a registered device to be within a certain proximity of a POS device and/or another registered device. For example, the device policy 312 of the first rule 314 requires the account holder's smartphone to be within five feet of a POS device at the time of a transaction in order for the transaction to be authorized. As another example, the device policy 312 of the fourth rule 320 requires the account holder's wearable device and the account holder's smartphone to be within five feet of each other at the time of a transaction in order for the transaction to be authorized.

Other embodiments may include different fields other than those included in the table 300 of FIG. 3. For example, in some embodiments, the transaction verification rules 126 may allow account holders to include additional security features, such as requiring an account holder to input a personal identification number (PIN) or to provide biometric identification (e.g., fingerprint, retinal scan, etc.).

Example scenarios will now be described in order to illustrate operation of the transaction verification rules 126 listed in the table 300 of FIG. 3, according to various embodiments. In one scenario, an account holder has specified third and fourth rules 318, 320 with respect to the account holder's debit card ending in 1235. The third rule 318 specifies that the debit card is allowed to be used only in Washington and California. The policy expires on Dec. 31, 2016. The debit card is registered to the smartphone 128 with the phone number ending in 7896.

In an example scenario, the debit card is used to attempt a transaction with a restaurant in New York. Upon attempting the transaction, the transaction verification logic 122 detects the transaction geolocation and verifies the debit card information according to the transaction verification rules 126. The transaction verification logic 122 alerts the account holder via the account holder's registered smartphone 128, requiring confirmation via the smartphone 128. The transaction verification logic 122 receives a response from the smartphone 128 and determines that the smartphone 128 and the debit card are in close proximity, thereby requiring a temporary approval over the phone from the account holder. If the transaction verification logic 122 detects fraudulent activity, the debit card is frozen until the account holder calls the FI and provides authentication.

In another scenario, the transaction verification logic 122 detects that the debit card ending in 1235 is being used at an ATM in Chicago for a cash withdrawal. The transaction verification logic 122 alerts the account holder via the account holder's smartphone 128 of possible fraudulent activity, as the debit card is only registered for use at ATMs in California or Washington. The account holder responds to the FI, confirming ATM use in Chicago during a layover.

In another scenario, an account holder has made travel plans to London for three months and does not share his or her travel itinerary with his or her FI. The account holder leaves for the trip, bringing the credit card ending in 1181 and a registered smartphone 128. When the account holder attempts to use the credit card in London for a purchase, the transaction verification logic 122 detects the transaction and verifies that the registered smartphone 128 is in close proximity to the credit card. The transaction verification logic checks the transaction verification rules 126 and verifies that the account holder policy 306 of the second rule 316 provides that the credit card is allowed to be used in London. The transaction verification logic 122 provides approval for the transaction, and sends a notification of the transaction to the account holder.

In another scenario, an account holder decides to withdraw some cash at a local branch store of his or her FI. The account holder typically wears a wearable device 132 (e.g., a bracelet) to help the account holder with banking needs, so that the account holder does not have to deal with physical cards. The wearable device 132 is exclusive to the account holder's biometrics. Thus, if someone else has stolen the wearable device 132 and walked in to attempt a transaction, the card will be blocked.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a computing system in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented method of facilitating payments from a financial account, the method comprising:
   receiving, by a processor of a banking system, a travel itinerary associated with an account holder, the travel itinerary including:
     an account holder identification (ID),
     a destination, and
     a time period associated with the destination;
   associating, by the processor, the travel itinerary of the account holder with a financial account of the account holder based on the account holder ID, the financial account including an associated payment device and an associated wearable device;
   building, by the processor, a dynamic travel profile for the account holder based at least in part on the travel itinerary, the dynamic travel profile being linked to the financial account of the account holder;
   receiving, by the processor from the payment device, a geolocation signal relating to a present location of the payment device at a first time, wherein the present location of the payment device at the first time is not associated with a transaction;
   determining, by the processor, that the present location does not correspond to an expected location at the first time as defined by the dynamic travel profile;
   analyzing, by the processor in response to determining that the present location does not correspond to the expected location, purchase history relating to the financial account to determine whether a purchase in a specified purchase category has occurred;
   updating, by the processor in response to a determination that the purchase in a specified purchase category has occurred, the dynamic travel profile based on the purchase;
   receiving, by the processor from a transaction device, an authorization request for a transaction involving the financial account, the authorization request including a transaction location and a transaction date, the transaction initiated via the payment device;
   analyzing, by the processor, a context of the authorization request, the context including the dynamic travel profile, a time history of geolocations of the payment device, and a time history of geolocations of a second device, the second device being associated with the financial account of the account holder;
   creating, by the processor, transaction verification rules for the financial account, the transaction verification rules based at least in part on the dynamic travel profile and the payment device, the transaction verification rules including a device proximity requirement, the device proximity requirement configured to be violated if a proximity between the payment device and the wearable device exceeds a predetermined proximity limit; and
   declining, by the processor, authorization of the transaction if the transaction location and the transaction date do not correspond to the destination and the time period of the dynamic travel profile, the transaction is unexpected based on the context, or if the device proximity requirement is violated.

2. The method of claim 1, wherein the destination is defined by at least one of a country, state city, street address, geolocation, and GPS coordinates.

3. The method of claim 1, wherein the destination is further defined by an area, the area defined by a circle having a pre-determined radius and centered at the at least one of a country, state, city, street address, geolocation, and GPS coordinates.

4. The method of claim 1, further comprising:
   detecting, by the processor, a change to the travel itinerary; and
   updating, by the processor, the dynamic travel profile based on the detected change to the travel itinerary.

5. The method of claim 1, further comprising:
   declining, by the processor, authorization of transactions using the payment device if the present location of the payment device and the first time do not correspond to the destination and the time period of the dynamic travel profile.

6. The method of claim 1, further comprising providing, by the processor, a notification to the account holder upon detecting violation of the transaction verification rules, the notification including a request for confirmation that the transaction is authorized.

7. The method of claim 6, further comprising:
   receiving, by the processor, confirmation from the account holder that the transaction is authorized; and
   approving the authorization request upon receiving the confirmation.

8. The method of claim 1, further comprising:
  detecting, by the processor, heightened fraud risk; and
  selecting, by the processor, enhanced transaction verification rules based on the heightened fraud risk.

9. The method of claim 1, wherein the context further includes at least one of purchase history and approved merchants.

10. The method of claim 1, further comprising transmitting, by the processor, in near real-time to a notification device, a summary of all charges to the financial account made via the payment device, the notification device including at least one of the payment device and the second device associated with the financial account of the account holder.

11. A payment system, comprising:
  a data storage system; and
  a processor and program logic stored in memory and executed by the processor, the program logic including:
    account management logic configured to retrieve account information associated with a financial account of an account holder;
    dynamic travel profile logic configured to:
      receive a travel itinerary associated with the account holder, the travel itinerary including:
        an account holder identification (ID),
        a destination, and
        a time period associated with the destination;
      associate the travel itinerary of the account holder to a financial account of the account holder based on the account holder ID, the financial account including an associated payment device and an associated wearable device; and
      build a dynamic travel profile for the account holder based at least in part on the travel itinerary, the dynamic travel profile being linked to the financial account of the account holder;
      receive a geolocation signal, from the payment device, relating to a present location of the payment device at a first time, wherein the present location of the payment device at the first time is not associated with a transaction;
      determine that the present location does not correspond to an expected location at the first time as defined by the dynamic travel profile;
      in response to determining that the present location does not correspond to the expected location at the first time, analyze purchase history relating to the financial account to determine whether a purchase in a specified purchase category has occurred;
      in response to a determination that the purchase in a specified purchase category has occurred, update the dynamic travel profile based on the purchase; and
    transaction verification logic configured to:
      receive, from a transaction device, an authorization request for a transaction involving the financial account, the authorization request including a transaction location and a transaction date, the transaction initiated via the payment device,
      analyze a context of the authorization request, the context including the dynamic travel profile, a time history of geolocations of the payment device and a time history of geolocations of a second device, the second device being associated with the financial account of the account holder;
      create transaction verification rules for the financial account, the transaction verification rules based at least in part on the dynamic travel profile and the payment device, the transaction verification rules including a device proximity requirement, the device proximity requirement configured to be violated if a proximity between the payment device and the wearable device exceeds a predetermined proximity limit, and
      decline authorization of the transaction if the transaction location and the transaction date do not correspond to the destination and the time period of the dynamic travel profile, the transaction is unexpected based on the context, or if the device proximity requirement is violated.

12. The system of claim 11, wherein the destination is defined by at least one of a country, state city, street address, geolocation, and GPS coordinates.

13. The system of claim 11, wherein the destination is further defined by an area, the area defined by a circle having a pre-determined radius and centered at the at least one of a country, state, city, street address, geolocation, and GPS coordinates.

14. The system of claim 11, wherein the dynamic travel profile logic is further configured to:
  detect a change to the travel itinerary; and
  update the dynamic travel profile based on the detected change to the travel itinerary.

15. The system of claim 11, wherein the transaction verification logic is further configured to:
  decline authorization of transactions using the payment device if the present location of the payment device and the first time do not correspond to the destination and the time period of the dynamic travel profile.

16. The system of claim 11, wherein the transaction verification logic is further configured to provide a notification to the account holder upon detecting violation of the transaction verification rules, the notification including a request for confirmation that the transaction is authorized.

17. The system of claim 16, wherein the transaction verification logic is further configured to:
  receive, from the account holder, confirmation that the transaction is authorized; and
  approve the authorization request upon receiving the confirmation.

18. The system of claim 11, further comprising fraud risk logic configured to detect heightened fraud risk based at least in part on the dynamic travel profile, wherein the transaction verification logic is configured to apply enhanced transaction verification rules based on the heightened fraud risk.

19. The system of claim 11, wherein the context further includes at least one of purchase history and approved merchants.

20. The system of claim 11, wherein the account management logic is further configured to transmit in near real-time to a notification device associated with the financial account, a summary of all charges to the financial account made via the payment device, the notification device including at least one of the payment device and the second device associated with the financial account of the account holder.

* * * * *